United States Patent [19]
Zeutschel

[11] 3,832,887
[45] Sept. 3, 1974

[54] ULTRASONIC INSPECTION APPARATUS
[75] Inventor: Milton F. Zeutschel, Issaquah, Wash.
[73] Assignee: Automation Industries, Inc., Los Angeles, Calif.
[22] Filed: Dec. 23, 1971
[21] Appl. No.: 211,345

Related U.S. Application Data
[63] Continuation of Ser. No. 836,436, June 25, 1969, abandoned.

[52] U.S. Cl............. 73/67.5 R, 73/67.8 R, 73/67.9
[51] Int. Cl............................................. G01n 29/04
[58] Field of Search.......................... 73/67.5–67.9

[56] References Cited
UNITED STATES PATENTS

| | | | |
|---|---|---|---|
| 2,461,543 | 2/1949 | Gunn................................ | 73/67.5 X |
| 2,612,772 | 10/1952 | McConnell....................... | 73/67.5 R |
| 2,728,405 | 12/1955 | Brant................................ | 73/67.5 X |
| 2,889,705 | 6/1959 | Hanysz et al. .................... | 73/67.8 |
| 2,971,372 | 2/1961 | Lewis et al....................... | 73/67.5 R |

FOREIGN PATENTS OR APPLICATIONS

| | | | |
|---|---|---|---|
| 180,393 | 7/1966 | U.S.S.R............................ | 73/67.5 R |
| 254,562 | 5/1967 | Austria............................... | 73/67.5 R |
| 494,971 | 8/1953 | Canada............................. | 73/67.5 R |
| 899,643 | 8/1944 | France.............................. | 73/67.5 R |

OTHER PUBLICATIONS
J. L. Melchor et al. Ultrasonic Studies of Polymethyl Methacrylate, Industrial and Engineering Chemistry, April 1952, p. 716–719.

Primary Examiner—Richard C. Queisser
Assistant Examiner—John P. Beauchamp
Attorney, Agent, or Firm—Dan R. Sadler

[57] ABSTRACT

A nondestructive material tester is described which transmits utltrasonic energy into a workpiece and receives the returning ultrasonic energy from the workpiece. The return signals are received by two different channels which sample the received signal at two time-displaced intervals such as a phase shift of 90° from the other. The pair of sample signals is displayed to precisely indicate the amount of phase displacement of the received signal.

22 Claims, 5 Drawing Figures

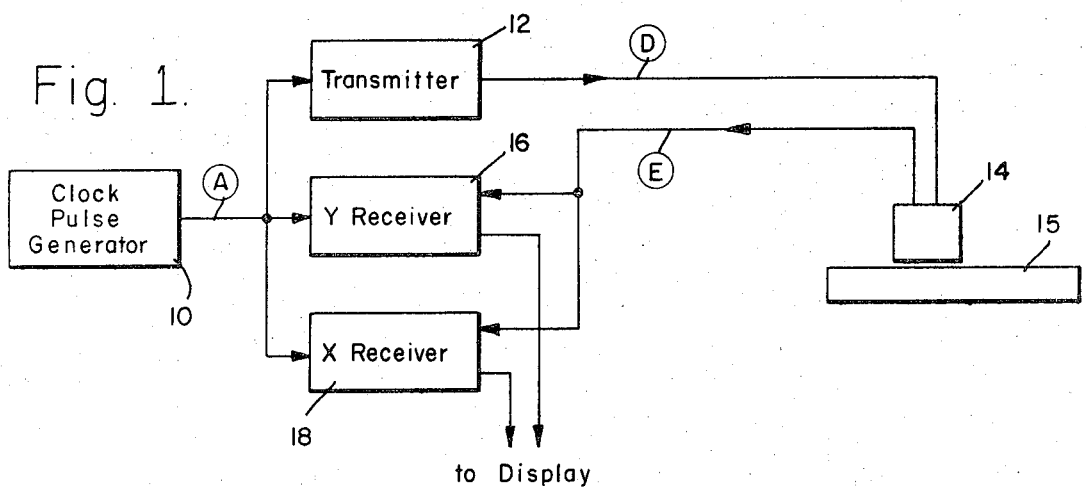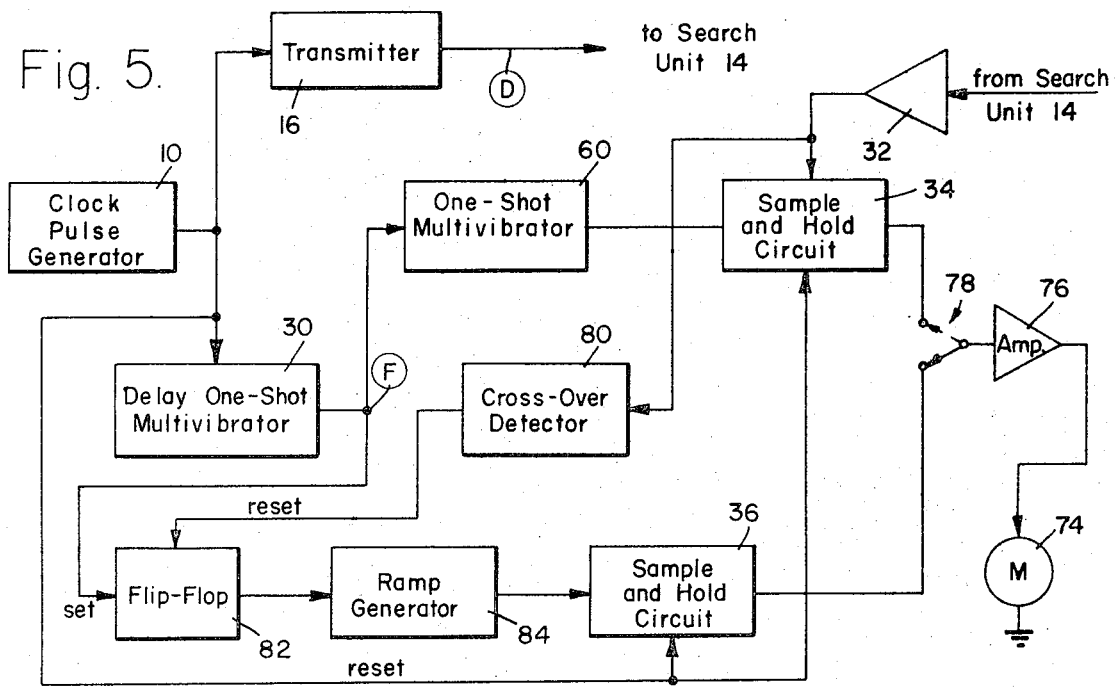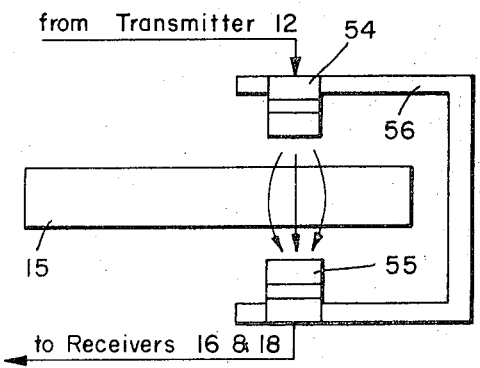

ULTRASONIC INSPECTION APPARATUS

CROSS-REFERENCE TO RELATED APPLICATIONS

This application is a continuation of co-pending application for U.S. Pat. Ser. No. 836,436, filed June 25, 1969, now abandoned for "Material Tester," on behalf of Milton F. Zeutschel and assigned to Automation Industries, Inc.

BACKGROUND

This invention relates to material testers and more particularly to a novel and improved ultrasonic nondestructive material tester useful for testing a workpiece for flaws, defects or other types of discontinuities.

In the prior art there is provided electrical nondestructive test equipment which generates ultrasonic vibrations by use of a crystal transducer. The vibrations from the transducer are then sent in the form of an acoustical pulse beam into the workpiece being tested. The beam travels unimpeded through large metallic parts and reflects back from the end surface thereof.

Any flaw, defect or other discontinuity in the workpiece also causes reflections of the acoustical beam back to the instrument such as an oscilloscope. The search unit need only access to one side of the workpiece being tested. The pulsed high frequency vibration is projected from the search unit into the workpiece. A portion of the pulse is reflected back by the flaw or defect and the balance is reflected from the end surfaces.

The return energy is displayed on the oscilloscope as vertical spikes. The screen on the oscilloscope exhibits electrical waveforms in the form of spikes of the initial pulse, the defect and the back and front surface reflections. Spacing of the spike on the scope is in proportion to the distance the beam traveled in the material tested, thus locating the position of any flaw by irregular spaced spikes. Also, such a tester is used to determine the thickness of the workpiece by the regularity of the return back and front surface spikes. If any discrepancies appear in the thickness they are detected by the relative change in the spikes displayed on the scope.

SUMMARY

Briefly described the embodiment of the invention disclosed herein includes apparatus for the nondestructive testing of a workpiece for flaws, defects or other discontinuities. A clock pulse generator provides a signal to a transmitter which provides a number of pulses in response thereto. A search unit is coupled to the transmitter and includes a transmit transducer which provides energy to the workpiece. The search unit also includes a receive transducer which receives the energy transmitted by the transmit transducers.

In one embodiment the search unit comprises a transducer on either side of the workpiece and the ultrasonic energy is transmitted from the transmit transducer through the workpiece and into the receive transducer. Another embodiment provides a contact transducer as described in copending application Ser. No. 836,002 for Material Tester, filed on June 24, 1969, in the name of Milton F. Zeutschel and assigned of record to Automation Industries, Inc., which provides ultrasonic energy to the workpiece causing the workpiece to vibrate in its thickness mode. A second receive transducer is spaced a fixed distance from the transmit transducer and detects the vibration of the workpiece due to the energy transmitted thereto by the transmit transducer. The vibrations shift in time of arrival at the receive transducer is a function of the quality and structure of the workpiece.

In one embodiment of the system a pair of receive channels is provided to sample the incoming signals detected by the receive transducer. A first receive channel is responsive to the receive transducer and samples the received energy on certain clock pulses provided by the clock pulse generator. A second receive channel is responsive to the receive transducer and is adapted to receive the energy on delayed clock times. Each receive channel provides a sample and hold gate which provides an analog signal indicative of the particular sample time. The sample and hold gate of one receive transducer is directly coupled into one of the deflection plates of a cathode ray tube and the other channel into the other set of deflection plates of a cathode ray tube. Each signal from each channel provides a fixed frame of reference, in that the amplitude varied with the sample taken from the respective signals.

As a workpiece is moved between the transmit and receive transducers, energy flows through the air through the workpiece and back into the receive transducer. If a flaw or defect is present in the path of the ultrasonic energy, the sound vibrations strike the part under test and a large part is reflected away. However, some of the vibrations enter the workpiece and pass through to the other side. From this energy which has reached the other side, a small portion is transmitted into the air on the opposite side of the workpiece. This transmitted energy is received by the receive transducer where it is converted to the electrical signal and processed in the manner hereinbefore described.

When a defect is present within the workpiece the ultrasonic energy tends to take the path of least resistance, and that would be around the defect or void, thus causing a phase shift in time in the signal as it reaches the receive transducer. That is, the signal takes a longer time to get from the transmit transducer to the receive transducer. While this change in time causes the signal to be physically displaced, the sample periods provided in the first and second receiver will remain constant and the amplitude in the sample and hold gate will vary accordingly.

DRAWINGS

These and other features and advantages will become more apparent to those skilled in the art when taken into consideration with the following detailed description, wherein like reference numerals indicate like and corresponding parts throughout the several views, and wherein:

FIG. 1 is a block diagram illustrating one embodiment of this invention;

FIG. 4 is an illustration of a search unit using a through transmission technique; and FIG. 5 is a block diagram illustrating a second embodiment of this invention.

DESCRIPTION

A clock pulse generator 10 provides a clock pulse or timing signal at a regulated repetitious time ($T_R$). This timing signal is referred to as pulse A and its timing is shown in a graph in FIG. 3.

This timing signal is coupled to the transmitter 12. Each time a timing signal A occurs the transmitter 12 produces a sequence or train of electrical pulses. These electrical pulses which occur at a predetermined frequency or pulse repetition rate are coupled to the search unit 14. The signal or pulse train produced by the transmitter 12 is illustrated in graph D shown in FIG. 3. As an example, the voltage of the pulses may be −250 volts.

When the pulse train D is applied to the search unit 14, the search unit 14 radiates or transmits acoustic energy which may be in the sonic or ultrasonic range. This energy is radiated into and/or throughout the workpiece 15.

Figure 3:
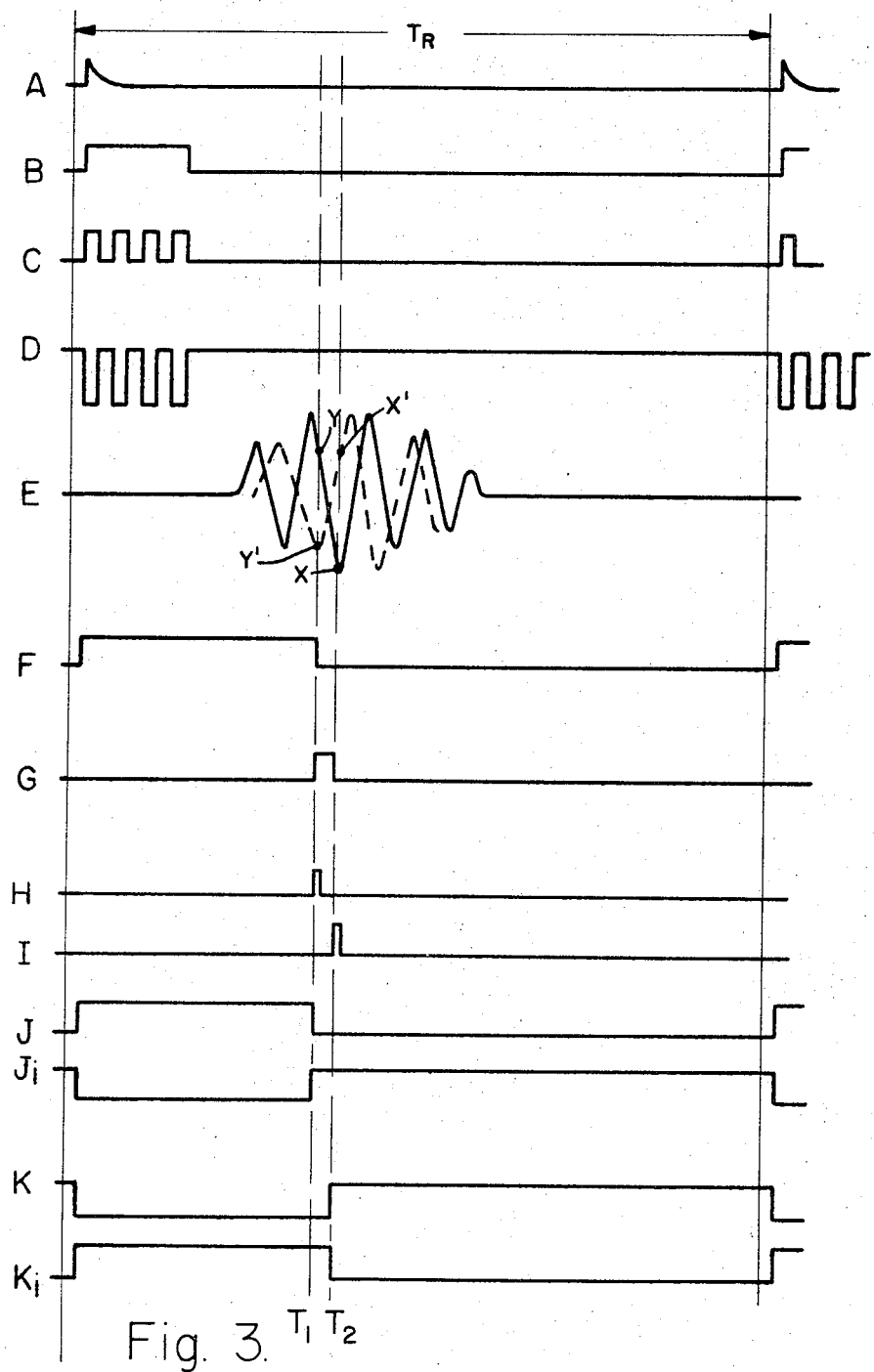
FIG. 3 is a graph illustrating waveforms taken at different points throughout the circuitry shown in FIG. 2.

In addition the search unit 14 also receives the acoustic energy from the workpiece and provides a receive energy signal E (FIG. 3). A pair of receivers referred to generally as Y receiver 16 and X receiver 18 are coupled to the search unit 14. Both of the receivers 16 and 18 receive the signal E from the search unit 14.

The Y receiver 16 samples the return signal E from the transducer 14 at one predetermined time period and supplies the sample signal to a display. The X receiver 18 samples the return signal E from the search unit 14 at a different and delayed time and feeds this to the display.

Figure 2:
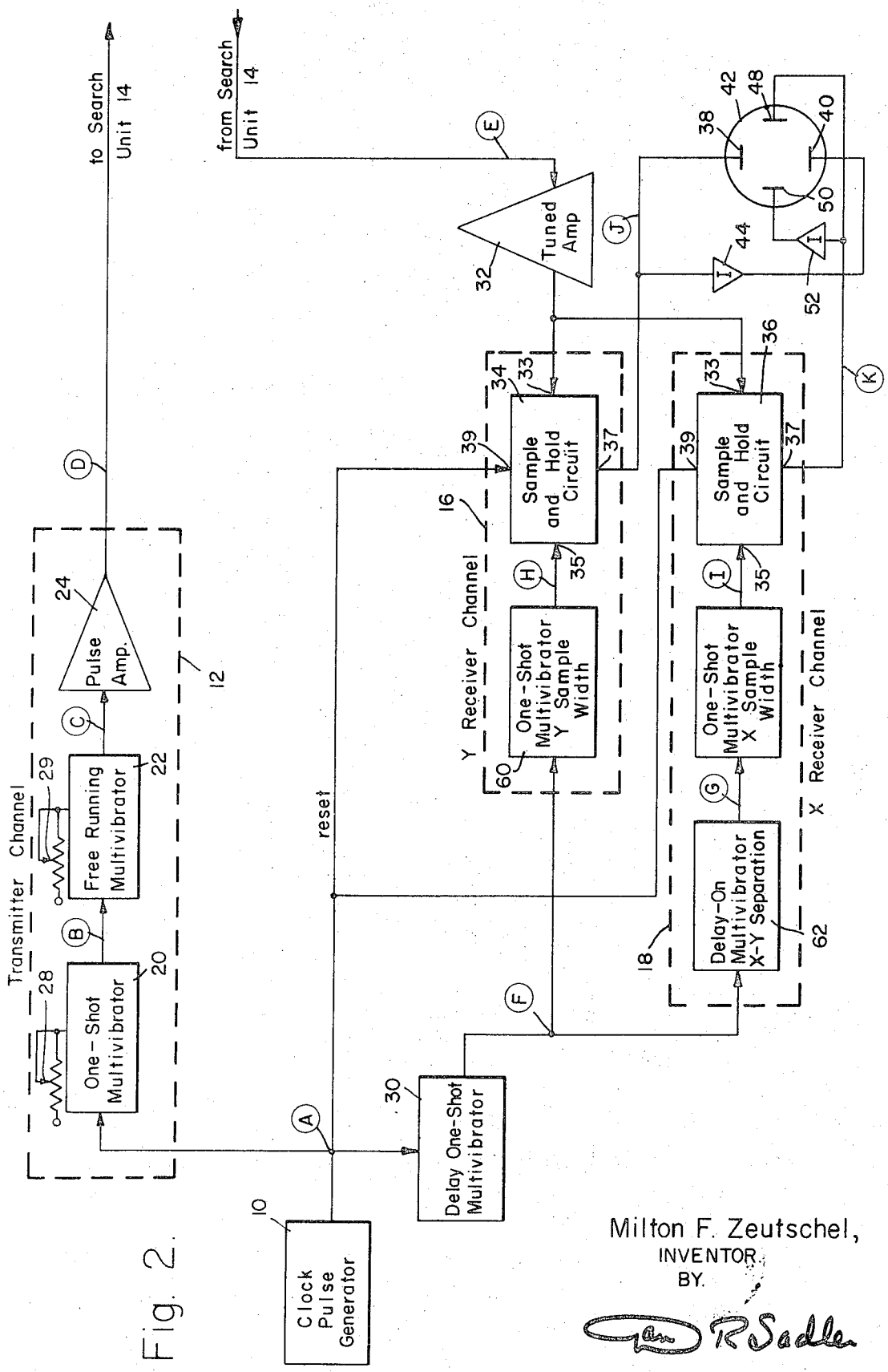
FIG. 2 is a more detailed block diagram of the embodiment shown in FIG. 1.

FIG. 2 illustrates in more detail the transmitter 12. Transmitter 12 comprises an astable multivibrator 20 which is coupled to the output of the clock 10. Each time the timing pulse A occurs the multivibrator 20 provides a square wave signal B having a prdetermined pulse width as shown in graph B in FIG. 3. For the purpose of this description, astable multivibrators will sometimes be referred to simply as "oneshots."

The leading edge of the signal B starts a free-running multivibrator 22 which provides a number of pulses C. The number of pulses provided by multivibrator 22 depends upon the length of the pulse B. The duration of the pulse B from the multivibrator 20 determines the number of pulses which will be transmitted. Also, the frequency at which the free-running multivibrator 22 runs determines the spacing of the individual pulses and the frequency of the transmitted pulse C. The probe signals C are applied to a pulse amplifier 24 where they amplified as shown in FIG. 3D. Thereafter, the pulses D are coupled to the search unit 14 which will be described in connection with FIG. 4.

Both the one-shot multivibrator 20 and the freerunning multivibrator 22 are adjustable as evidenced by the adjustable potentiometers 28 and 29, respectively. The potentiometer 28 will vary the width or duration of pulse B to allow the free-running multivibrator 22 to be turned ON or OFF for a longer or shorter period of time. The potentiometer 29 regulates the frequency of the free-running multivibrator 22 for varying the space between the pulses and hence the frequency of the pulses C therefrom.

The clock generator 10 also provides the processing signal to the Y receive channel 16 and the X receive channel 18. The clock pulse A from the clock pulse generator 10 is first applied to a delay one-shot multivibrator 30. The multivibrator 30 delays the clock pulse to the receive channels 16 and 18 by an interval of time on the order of the time required for the acoustic energy to travel a distance equal to the distance between the transmit and receive transducers hereinafter to be explained in connection with FIG. 4.

The received signals E in FIG. 3 from the search unit 14 are supplied into a tuned amplifier 32. The tuned amplifier 32 is tuned to the same frequency as the free-running multivibrator 22. Hence it only receives signals within the frequency range of the multivibrator 22, i.e., the frequency of the transmitted ultrasonic energy thereby filtering out all undesirable frequencies.

The amplified signals E from the tuned amplifier 32 are applied to the signal input 33 of a sample and hold circuit 34 in the receive channel 16 and also the signal input 33 to a sample and hold circuit 36 in the receive channel 18. Since sample and hold circuits are well known in the electronic and especially the communications and radar art, no attempt will be made to describe typical circuitry and operation herein.

In principal the sample and hold circuits 34 and 36 sample the instantaneous amplitude of the signals on the inputs 33 and hold this amplitude for a predetermined time interval. The timing of the sampling is determined by the instantaneous gate times as defined by the signals H or I applied to the gate inputs 35. This provides output signals J and K on the signal outputs 37. These signals J and K are equal in amplitude to the instantaneous amplitudes of the signal E during the instantaneous gate times H and I.

The sample and hold circuit 34 or 36 samples the amplitude of the signals E as supplied from the search unit 14 and tuned amplifier 32. The samples are at predetermined times determined by the signals H and I. The circuits 34 and 36 apply the voltage level of the sample signals J and K thereof to the X and Y deflection plates 38 – 40 and 48 – 50 of the cathode ray tube 42.

Since one vertical plate 40 is opposed in operation to the other vertical plate 38, the sample signal J from the sample and hold circuit 34 is first coupled through an inverter 44. The inverter 44 produces a deflection signal $J_i$ which is a mirror image or negative inversion of the signal J. The signal J is thus inverted.

The other sample and hold circuit 36 samples the signal E from the tuned amplifier 32 at a different predetermined time as determined by the signal I. The circuit 36 then applies the sample signal K directly to the X plate 48. It also supplies the signal K to the inverter 52 which then applies the inverted signal $K_i$ to the X plate 50. The configuration of the output signals of the sample and hold circuit 36 is illustrated as graph K and $K_i$ in FIG. 3.

The sample time periods in which the sample and hold circuits 34 and 36 are triggered should, in most cases, remain fixed. The commencement of the time periods corresponds to the timing represented by the dashed vertical time lines $T_1$ and $T_2$. These time lines $T_1$ and $T_2$ intersect the received signal at the points illustrated as dots X and Y on graph E in FIG. 3.

In providing this fixed sample period the output from the multivibrator 30 is coupled to the control input of a oneshot multivibrator 60 in the Y receiver channel 16 and the control input of a one-shot multivibrator 62 in the X receiver channel 18.

The signal H from the one-shot multivibrator 60 defines the fixed Y sample time. This commences at time $T_1$ as illustrated in graph H in FIG. 3. The pulse H from the oneshot multivibrator 60 occurs immediately after the fall of the phase delay output square wave F from the delay one-shot multivibrator 30.

The output pulse from the delay one-shot multivibrator 30 is also coupled into a delay one-shot 62. The output pulse G of this multivibrator 62 is illustrated in graph G of FIG. 3. The time duration of this pulse G defines the duration of the time delay between sample times $T_1$ and $T_2$.

In most instances the time delay provided by the delay one-shot multivibrator 62 is equal to some preselected time interval. In the present instance, by way of example, it is equal to approximately one quadrant or a 90° phase shift of the pulses provided by the free-running multivibrator 22, or one-fourth the pulses shown in graph C. This, then, in essence provides a total phase shift of 90° between the Y sample pulse and the X sample pulse indicated as H and I in FIG. 3. However, it is readily apparent that a wide variety of different time delay intervals may be used.

Referring now to FIG. 4 there is shown a search unit 53 of the through transmission type. This search unit 53 includes a pair of transducers 54 and 55 adapted to be disposed on the opposite sides of the workpiece 15. Each of the transducers 54 and 55 may include a piezoelectric crystal which vibrates when excited with electrical energy.

The transducers 54 and 55 are positioned facing each other and secured a fixed distance apart by the C-shaped bracket 56 as one example. The workpiece 15 is positioned between the transducers 54 and 55.

These transducers may be of any desired variety. By way of example, they are of the air coupled type as described in co-pending application Ser. No. 836,295 entitled "Ultrasonic Material Tester" filed on behalf of Milton F. Zeutschel and assigned to the assignee of this invention. It will be seen that in the search unit 56 of FIG. 4 the energy is propagated from the transducer 54 directly through the workpiece 15 to the transducer 55. In the search unit 14 the ultrasonic energy is transmitted and received in essentially the same manner after it propagates through the workpiece 15.

The transducer 54 is coupled to the transmitter 12 as shown in FIGS. 1 and 2 and has the pulse train signal D applied thereto. The receive transducer 55 is coupled to the amplifier 32 so as to amplify signal E and feed it to the receivers 16 and 18.

Ultrasonic energy is transmitted from the transducer 54 through the workpiece 15 and into the receive transducer 55. A portion of the ulrasonic energy is attenuated in the air and a portion is reflected from the workpiece surfaces. However, if the frequency is relatively low, for example 20 KCS to 75 KCS, a large portion of the ultrasonic energy is received in the receive transducer 55. This received energy is then processed in the receivers 16 and 18.

It is important to note that if the workpiece 15 is free of any voids, defects or other discontinuities, the flight time of the ultrasonic energy from the transmit transducer 54 to the receive transducer 55 is always a fixed interval. However, if the workpiece 15 includes a void, etc., the energy will be delayed by the void and/or will have to travel a longer path around the void. As a consequence, the flight time of the energy from transducer 54 to 55 will be increased. Of course the converse of this may be true; i.e., a defect may cause the flight time to be reduced.

The signal E in FIG. 3 illustrates the delayed condition. The signal E represented by the solid line represents one set of operating conditions, for example, a workpiece 15 of acceptable quality. In contrast the dashed line represents the signal E resulting from a workpiece having characteristics of a quality differing from the acceptable quality. In the present instance this causes a delay or increase in the flight time.

It should be noted that if the frequency is relatively low (i.e., 20 to 75 KCS), as is desirable for air coupling, the amount of the delay is relatively small compared to the wavelength of the energy. For example as may be seen from the illustrated example, the delay is on the order of, say, 90°. As a consequence, if the amount of delay is detected by detecting the envelope of the wave packet, as has been done in the prior art, it is extremely difficult if not impossible to detect the shift.

Referring again to FIG. 3, the sample signal H as provided by the one-shot multivibrator 60 in the Y receive channel 16 defines the sample time $T_1$. This causes the sample and hold circuit 34 to sample the received signal E as illustrated by dot Y shown on graph E. The sample signal I provided by the one-shot multivibrator in the X receiver 18 defines the sample time $T_2$. This causes the sample and hold circuit 36 to sample the received signal as shown by the dot X on Graph E.

The amplitude of the sample and hold signal J in receiver 16 is equal to the amplitude of the position of dot Y of graph E. The amplitude of the sample and hold signal K in receiver 18 is equal to the amplitude of the position of the dot X of graph E.

The sample and hold signal J from the circuit 34 in the Y receiver 16 is coupled directly to the vertical deflection plate 38 in the cathode ray tube 42. It is also coupled by means of the signal inverter 44 as signal $J_i$ to the opposed vertical deflection plate 40. It will thus be seen that the electron beam in the cathode ray tube 42 will be deflected vertically on the face of the tube as a function of the amplitude of the signal E at sample time $T_1$.

The sample and hold signal K from the circuit 36 in the X receiver 18 is coupled directly to the horizontal deflection plate 48 and indirectly as signal $K_i$ by the inverter 52 to the horizontal deflection plate 50. As a consequence, the electron beam in the tube 42 will be deflected horizontally on the face of the tube 42 as a function of the amplitudes of the signal E at sample time $T_2$.

It may thus be seen when a workpiece 15 is disposed between the transducers 54 and 55 a bright spot will be produced on the face of the cathode ray tube 42. The horizontal and vertical positions of the spot will be a function of sample signals $J - J_i$ and $K - K_i$. If the workpiece and search unit remain in fixed positions, the bright spot will also remain in a fixed position on the face of the tube 42.

However, if the workpiece 15 is moving through the search unit and the signal E varies, the position of the bright spot will vary. If the signal E remains at a constant amplitude but its phase shifts over 360°, the spot will move around the tube 42 and in effect describe a circle. As the amplitude of the signal E varies, the magnitude of the displacement of the bright spot from the center of the tube 42 will vary. This in turn means the radius of the above-described circle will vary.

It may be seen that in effect the bright spot represents the head of a vector corresponding to the signal E. The tail of this vector is positioned in the center of the face of tube 42. In other words, the display on the face of the tube 42 corresponds to a polar coordinate display representing the phase and amplitude of the signal E.

If a defect or other discrepancy is present in the workpiece 15, the flight time for ultrasonic energy to travel from the transducer 54 to 55 will be increased. This will then cause the signal as shown in graph E to shift in time to the right. This new signal is illustrated in graph E of FIG. 3 and shown in dotted line and the sample signals are shown as points or dots $X_i$ and $Y_i$. The sample times $T_1$ and $T_2$ and the sampling signals H and I remain the same, and the dots Y and X on graph E will also remain constant. This will cause the sample signals $J - J_i$ and $K - K_i$ of signal E to increase or decrease as the amplitude and phase of the signal E varies. The sample signals are detected by the sample and hold circuits 34 and 36 but these occur at different points on the sine wave signal E.

At the end of one clock repetition time ($T_R$), a new signal A is introduced into the system. This signal A provides reset signals to inputs 39 of the sample and hold circuits 34 and 36. This discharges the circuits 34 and 36 and causes the amplitudes of the signals on the outputs to return to zero. The circuits 34 and 36 are now ready to receive and sample the next received signal from the amplifier 32.

In order to inspect a workpiece 15 the search unit 14 or 56 is scanned along the workpiece 15. The transit time and attenuation for the ultrasonic energy will remain substantially constant. As a consequence, the amplitude and phase of the signal E will remain constant and the received signal will be essentially the same as the solid line signal E. This in turn will result in the bright spot on the face of the cathode ray tube remaining in a virtually constant or fixed position.

However, if the workpiece 15 varies, the transit time of the energy will vary whereby the signal E will shift to a position such as shown by the dashed line. When this occurs the magnitudes of the signal E at sample times $T_1$ and $T_2$ change. This, in turn, changes the sample signals $J - J_i$ and $K - K_i$ whereby the bright spot will move to a new position at a different angle and/or radius. As a consequence, by observing the angular and/or radial position of the bright spot it can be determined whether the workpiece 15 is within an acceptable range.

Referring now to FIG. 5 there is shown in block diagram form a second embodiment of this invention. This embodiment comprises a different form of the system particularly adapted so as to be capable of detecting both the amplitude of the signal E and the phase of the signal E. The clock generator 10 provides initiation pulses A to the transmitter 16 and to delay one-shot multivibrator 30. This is substantially identical to that described in connection with FIG. 2. The transmitter 16 provides the pulses shown in graph D of FIG. 3. The amplifier 32 is coupled to the search unit 14 or 53 and receives the signals E illustrated in graph E of FIG. 3.

The one-shot multivibrator 30 is similar to that in the embodiment of FIG. 2. It produces a delay pulse F and supplies it to the one-shot multivibrator 60. The multivibrator 60 is responsive to the termination of the pulse F and provides a pulse H. In this particular embodiment this pulse H is normally of a somewhat longer duration than that shown in connection with the embodiment set forth in FIG. 2. The output of the one-shot multivibrator 60 is coupled to the control input of a sample and hold circuit 34. Since the one-shot multivibrator 60 provides a somewhat longer pulse width than the sample pulse for the embodiment of FIG. 2, the sample encompasses a somewhat greater segment of the receive signal E. This sample signal is then fed via switch 78 to the amplifier 76 and thence to meter 74. The meter 74 will thereby indicate the amplitude of received signal E at a particular instant of time. This indication corresponds to the angular position of the bright spot produced on the face of the tube 42 in the preceding embodiment.

If the phase of the signal E is to be detected, in this particular embodiment the switch 78 is set to the position shown. A crossover detector 80 is coupled to the output of the amplifier 32 so as to receive the signal E. The crossover detector 80 detects the exact time of the crossover of all return signals E from the search unit 14, i.e., the instant of time when the signal E passes through zero.

A flip-flop 82 has its set input coupled to the delay one-shot multivibrator 30 and its reset input coupled to the output of the crossover detector 80. Thus the flip-flop 82 is set on the trailing edge of the delay signal F, and reset by the first time the received signal E passes through zero. The output of the flip-flop 82 is connected to the trigger input of a ramp generator 84.

When the flip-flop 82 is set this starts the ramp generator 84 whereby the ramp signal commences. The ramp signal is coupled to a sample and hold circuit 36. The ramp signal begins at the start of a flip-flop signal and continues until the first crossover signal resets the flip-flop 82.

When the flip-flop 82 resets it turns off the ramp generator 84. When the ramp generator 84 generates a signal, it stays ON until the next crossover signal is detected. If there is a shift in phase or a shift in time for the ultrasonic energy to travel from transducer 54 to 55, this causes the received signal E to be received at a later time. As a result the crossover detector 80 does not trigger until a later time. The flip-flop 82 then stays ON for a longer time. Thus, the ramp generator 84 generates a high voltage signal and this is fed into the sample or hold circuit 36. This increased delay is then displayed in the meter 74. This indication thus corresponds to the angular position of the bright spot on the face of the tube 42 in FIG. 2.

It will be seen that the present invention provides an ultrasonic nondestructive tester which is capable of resolving the flight time of the energy with a much higher degree of precision than has been possible heretofore. Heretofore, it has been customary to receive and/or detect the envelope of the "wave packet" as seen in FIG. E. In contrast, in the present instance means are provided for resolving a "phase shift" or time displacement of the individual cycles in the signal E.

This is of particular advantage where the signal E is of low frequency. For example, if the frequency is in the range of from 20 to 75 KCS it is possible to employ an air coupled search unit. However, in spite of the resultant longer wavelengths, it is possible to accurately resolve even small changes in the flight time. This is true whether the ultrasonic energy travels longitudinally of the workpiece 15 by the search unit 14 as shown in FIG. 1 or transversely through the workpiece 15 by the search unit 53 as shown in FIG. 4.

Having thus described but two preferred embodiments of this invention, what is claimed is:

1. A material tester for inspecting a workpiece, said material tester including
   a transmitter for producing a driving signal,
   transmitting search unit means coupled to said transmitter and responsive to said driving signal for transmitting a multicycle burst of ultrasonic energy into the workpiece,
   receiving search unit means effective to receive said burst of energy from said workpiece, said receiving search unit means being effective to produce a multicycle signal corresponding to said burst and having a time duration corresponding to the duration of said burst,
   a receiver coupled to said receiving search unit means and responsive to the signal therefrom to produce a multicycle received signal, and
   means in said receiver coupled to the transmitter, said last means being responsive to said received signal at a predetermined reference time after said driving signal for a predetermined sample time shorter than the duration of said burst and effective to produce an output signal which is a function of the variations in the instantaneous value of said received signal.

2. A material tester for inspecting a workpiece, said material tester including
   a transmitter for producing a driving signal,
   transmitting search unit means coupled to said transmitter and responsive to the driving signal from said transmitter and effective to transmit ultrasonic energy into said workpiece,
   receiving search unit means effective to receive said energy from said workpiece and to produce a signal corresponding thereto,
   a receiver coupled to said search unit means and responsive to the signal therefrom to produce a received signal,
   first sampling means in said receiver and coupled to said transmitter, said first sampling means being responsive to said driving signal and effective at a first predetermined reference time after said driving signal to sample said received signal and provide a first sample signal that is a function of said received signal at said first reference time, and
   second sampling means in said receiver and coupled to said transmitter, said second sampling means being responsive to said driving signal and effective at a second predetermined reference time after said driving signal to sample said received signal and provide a second sample signal that is a function of the received signal at said second reference time.

3. The material tester of claim 2 including
   a cathode ray tube having first deflection means coupled to the first sampling means and second deflection means coupled to the second sampling means.

4. The material tester of claim 2 including
   timing means coupled to said transmitter and responsive to said driving signal, said timing means being coupled to said first and second sampling means.

5. A material tester for inspecting a workpiece, said material tester including
   transmitting search unit means for transmitting ultrasonic energy into the workpiece,
   receiving search unit means for receiving said ultrasonic energy from the workpiece and effective to produce a signal corresponding to the received ultrasonic energy,
   a transmitter coupled to the transmitting search unit means for energizing the search unit means whereby said ultrasonic energy is transmitted into the workpiece and a signal is produced by the receiving search unit means corresponding to the received energy,
   a receiver coupled to the receiving search unit means for receiving said signal, and
   sampling means in said receiver coupled to the transmitter and effective to sample the received signal at a particular reference time after the transmission of said ultrasonic energy to produce a signal which is a function of the received signal at said predetermined reference time.

6. A material tester for inspecting a workpiece, said material tester including
   transmitting search unit means for transmitting ultrasonic energy into the workpiece,
   receiving search unit means for receiving said ultrasonic energy from said workpiece and being effective to produce a signal corresponding to the received ultrasonic energy,
   a transmitter coupled to the transmitting search unit means fo energizing the search unit means whereby said ultrasonic energy is transmitted into the workpiece and the signal produced by the receiving search unit means corresponds to the characteristics of the workpiece,
   a receiver coupled to the receiving search unit means for receiving the signal therefrom,
   a first channel in said receiver, said channel including first time delay means coupled to the transmitter and first sampling means, said first sampling means being effective to sample the received signal at a first particular reference time determined by said time delay means to produce a first sample signal which is a function of the received signal at said first predetermined reference time, and
   a second channel in said receiver, said second channel including second time delay means coupled to the transmitter and second sampling means, said second sampling means being effective to sample the received signal at a second particular reference time determined by said second delay means to produce a second reference signal which is a function of the received signal at said second predetermined reference time.

7. The material tester of claim 6 including
   a cathode ray tube having first deflection means coupled to the first channel and second deflection means coupled to the second channel.

8. A material tester including the combination of
   a first ultrasonic search unit,
   a transmitter coupled to said first search unit,
   a second ultrasonic search unit,
   a receiver coupled to said second search unit means, first signal sampling means in said receiver,
   second signal sampling means in said receiver, first timing means coupled to said transmitter and to said first signal sampling means, second timing means coupled to said transmitter and to said second signal sampling means, and a cathode ray tube coupled to the first and second signal sampling means.

9. The material tester of claim 8 including a transmit transducer in the first search unit coupled to the transmitter for transmitting ultrasonic energy, and a receiver transducer in the second search unit coupled to the receiver for receiving ultrasonic energy.

10. The material tester of claim 8 wherein said first and second signal sampling means include sample and hold circuits.

11. A material tester including the combination of a first ultrasonic search unit, a transmitter coupled to said first search unit, a second ultrasonic search unit, a receiver coupled to said second search unit, a first channel in said receiver, first signal sampling means in said first channel coupled to the second search unit, first timing means in said first channel coupled to the transmitter and to the first signal sampling means, a second channel in said receiver parallel to the first channel and coupled to the second search unit, second signal sampling means in said first channel coupled to the second search unit, second timing means in said second channel coupled to the transmitter and to the second signal sampling means, and a cathode ray tube having first deflection means coupled to the first channels and second deflection means coupled to the first channels and second deflection means coupled to the second channel.

12. A material tester for inspecting a workpiece, said material tester including search unit means for transmitting a multicycle burst of energy into the workpiece and receiving said energy from said workpiece, said search unit means being effective to produce a received signal corresponding to the energy received from said workpiece, and means coupled to said search unit means and responsive to the transmission of said burst of energy and effective to define a reference interval which occurs a predetermined time after said transmission and has a time duration shorter than the duration of said burst, said last means being responsive to the magnitude of said received signal during said reference interval.

13. The material tester of claim 12 including sampling means in said last means for sampling the received signal during said reference interval to produce an output signal, said output signal being a function of the magnitude of the received signal during said interval.

14. A material tester for inspecting a workpiece, said material tester including a transmitter for producing a driving signal, search unit means coupled to said transmitter and responsive to said driving signal for transmitting a multicycle burst of energy into the workpiece, said search unit means being effective to receive said energy from said workpiece and produce a multicycle signal corresponding thereto, a receiver coupled to said search unit means and responsive to the signal therefrom to produce a received multicycle signal having a time duration corresponding to the time duration of said transmitted burst of energy, and sampling means in said receiver effective to sample said received signal during a sample interval to produce an output signal which is a function of the received signal during said sample interval, said sampling means being responsive to said driving signal whereby the sample interval is delayed a predetermined time from said transmitted burst and is shorter than said burst.

15. A material tester for inspecting a workpiece, said material tester including a transmitter for producing a driving signal, search unit means coupled to said transmitter and responsive to said driving signal for transmitting a multicycle burst of energy into the workpiece, said search unit means being effective to receive said energy from said workpiece and produce a multicycle signal corresponding thereto, a receiver coupled to said search unit means and responsive to the signal therefrom to produce a received multicycle signal having a time duration corresponding to the time duration of said transmitted burst of energy, sampling means having a sample interval which is shorter than said burst and said received signal, said sample means being coupled to said receiver to sample said received signal during said sample interval to produce an output signal which is a function of the received signal during said sample interval, and time delay means coupled to said transmitter and said sampling means, said time delay means being responsive to said driving signal and effective to actuate said sampling means whereby the sample interval is delayed a predetermined time from said transmitted burst.

16. A material tester for inspecting a workpiece, said material tester including a transmitter for producing a driving signal, search unit means coupled to said transmitter and responsive to the driving signal from transmitter and effective to transmit a multicycle burst of ultrasonic energy into said workpiece, said search unit means being effective to receive said energy from said workpiece and to produce a signal corresponding thereto, a receiver coupled to said search unit means and responsive to the signal therefrom to produce a received signal, first sampling means in said receiver for sampling said received signal during a first predetermined sample interval to produce a first sample signal that is a function of the received signal during said first sample interval, and second sampling means in said receiver for sampling said recieved signal during a second predetermined sample interval to provide a second sample that is a function of the received signal during said second sample interval, and time delay means coupled to said transmitter and responsive to said driving signal, said time delay means being coupled to said first and second sampling means whereby said first and second sample intervals are delayed from the driving signal by predetermined amounts and the sample intervals have durations which are shorter than the duration of said transmitted burst.

17. A material tester for inspecting a workpiece, said material tester including search unit means for transmitting a multicycle pulse of energy having a predetermined time duration into the workpiece search unit means being effective to receive said energy from said workpiece and produce a multicycle electrical signal having a time displacement and duration corresponding to the time displacement and duration of the energy, a transmitter coupled to the search unit means for energizing the search unit means for said predetermined time duration whereby said energy is transmitted into the workpiece and said multicycle electrical signal is produced by the search unit means corresponding to the received energy, a receiver coupled to the search unit means for receiving said multicycle electrical signal, and sampling means in said receiver and coupled to said transmitter to be responsive to the transmission of said pulse, said sampling means being effective to sample said electrical signal a predetermined time after said transmission and during a time interval which is shorter than said predetermined time duration to produce a signal which is a function of the time displacement of said received signal.

18. A material tester for inspecting a workpiece, said material tester including transmitting search unit means for transmitting a multicycle burst of ultrasonic energy into the workpiece, receiving search unit means for receiving said energy from said workpiece, said receiving search unit means being effective to produce a received signal having multiple cycles therein corresponding to said received energy, receiving means coupled to said receiving search unit means, said last means being responsive to the timing of the individual cycles within said received signal and the transmission of said burst of ultrasonic energy, sampling means in said receiving means for sampling the received signal during an individual cycle at a predetermined sample time to produce an output signal, said output signal being a function of the individual cycles within the received signal during said predetermined sample time, and means coupled to said sampling means and responsive to the transmission of said burst of ultrasonic energy, said means being effective to actuate said sampling means at a predetermined time after the transmission of said burst whereby said output signal is a function of the received signal during said sample time.

19. A material tester for inspecting a workpiece, said material tester including a transmitter effective to produce a timing pulse, transmitting search unit means coupled to said transmitter for transmitting a multicycle burst of ultrasonic energy into the workpiece in response to said timing pulse, receiving search unit means for receiving said burst of energy from said workpiece whereby the individual cycles of said received energy have a time displacement which is a function of the characteristics of the workpiece, said receiving search unit means being effective to produce a received signal corresponding to said received energy, said received signal including a pulse having a multiple cycle therein wherein the individual cycles in said received signal have a time displacement from the individual cycles in the transmitted burst which is a function of said characteristics of the workpiece, means coupled to said transmitter and said receiving search unit means, said last means being responsive to the time displacement of a portion of the individual cycles in said received signal relative to said timing pulse to produce a second signal which is a function of the characteristics of the workpiece, sampling means in said last means for sampling the received signal, and time delay means coupled to said sampling means and responsive to a timing pulse to actuate the sampling means a predetermined time after the transmission of said burst of ultrasonic energy whereby the received signal is sampled during an individual cycle thereof to produce an output signal which is a function of the timing of the individual cycles within the received signal.

20. A material tester for inspecting a workpiece, said material tester including a transmitter for producing a driving signal, transmitting search unit means coupled to said transmitter and responsive to said driving signal for transmitting a multicycle burst of ultrasonic energy into the workpiece, receiving search unit means effective to receive said burst of energy from said workpiece, said receiving search unit means being effective to produce a multicycle signal corresponding to said burst and having a time duration corresponding to the duration of said burst, a receiver coupled to said receiving search unit means and responsive to the signal therefrom to produce a multicycle received signal, means in said receiver coupled to the transmitter, said last means being responsive to said received signal at a predetermined reference time after said driving signal for a predetermined sample time shorter than the duration of said burst and effective to produce an output signal which is a function of the variations in the instantaneous value of said received signal.

said last means includes means for sampling said received signal at said predetermined reference time for said predetermined sample time and means for holding said sample whereby the output signal is a function of the value of the received signal during said sample time.

21. A material tester for inspecting a workpiece, said material tester including a transmitter effective to produce a timing pulse, transmitting search unit means coupled to said transmitter for transmitting a multicycle burst of ultrasonic energy into the workpiece in response to said timing pulse, receiving search unit means for receiving said burst of energy from said workpiece whereby the individual cycles of said received energy have a time displacement which is a function of the characteristics of the workpiece, said receiving search unit means being effective to produce a received signal corresponding to said received energy, said received signal including a pulse having multiple cycles therein wherein the individual cycles in said received signal have a time displacement from the individual cycles in the transmitted burst which is a function of said characteristics of the workpiece, means coupled to said transmitter and said receiving search unit means, said last means being responsive to the time displacement of a portion of the individual cycles in said received signal relative to said timing pulse to produce a second signal which is a function of the characteristics of the workpiece, said last means includes means responsive to the time the instantaneous value of the received signal equals a predetermined amount and means responsive to the time delay between the transmission of said burst of ultrasonic energy and the time the said instantaneous value occurs whereby said output signal is a function of the time the instantaneous value equals said predetermined amount.

22. A material tester for inspecting a workpiece, said material tester including search unit means for transmitting a multicycle burst of energy into the workpiece and receiving said energy from said workpiece whereby the individual cycles of the received energy have a time displacement from the individual cycles of the transmitted burst which is a function of the characteristics of the workpiece, said search unit means being effective to produce a received signal corresponding to said received energy whereby the individual cycles in said received signal having a time displacement which is a function of said characteristics of the workpiece, means coupled to said search unit means and responsive to said time displacement of the individual cycles in said signal to produce a second signal which is a function of the characteristics of the workpiece, and sampling means in said last means responsive to the transmission of said burst of energy and effective to sample the received signal during a sample interval to produce an output signal, said sample interval occurring a predetermined time interval after the transmission of said burst and having a time duration which is shorter than the duration of said transmitted burst whereby the output signal is a function of the timing of the individual cycles within the received signal.

* * * * *